LE BARON C. COLT.
APPARATUS FOR VARNISHING RUBBER SHOES.
APPLICATION FILED JAN. 18, 1909.

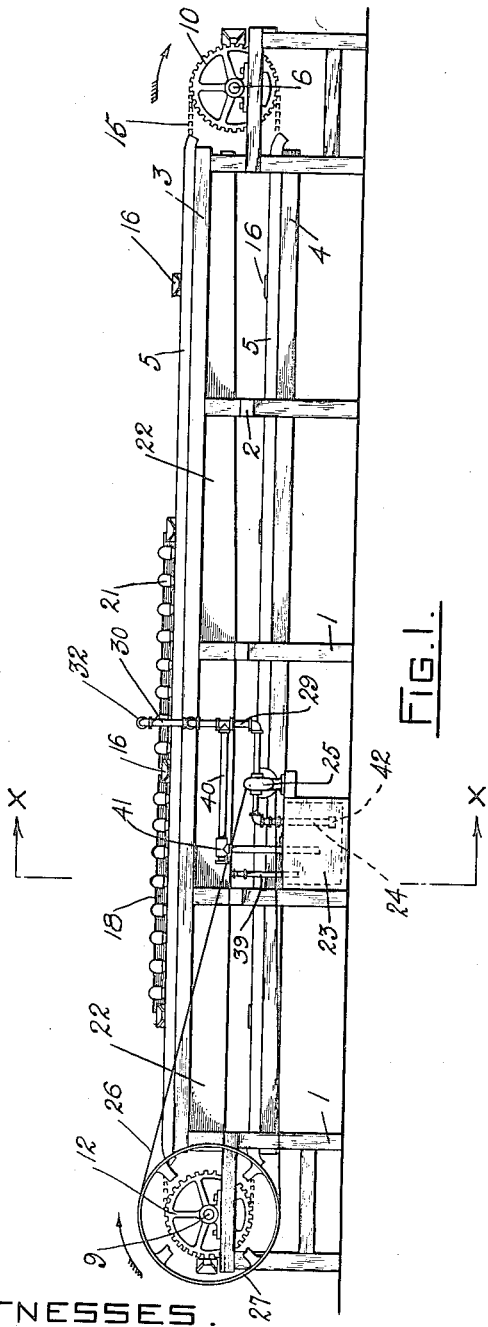

1,225,013.

Patented May 8, 1917.
2 SHEETS—SHEET 2.

WITNESSES.
Catherine G. Bradley
James H. Thurston

INVENTOR.
Le Baron C. Colt,
By Wilmarth H. Thurston,
ATTORNEY.

UNITED STATES PATENT OFFICE.

LE BARON C. COLT, OF BRISTOL, RHODE ISLAND, ASSIGNOR TO NATIONAL INDIA RUBBER COMPANY, A CORPORATION OF RHODE ISLAND.

APPARATUS FOR VARNISHING RUBBER SHOES.

1,225,013.

Specification of Letters Patent.

Patented May 8, 1917.

Application filed January 18, 1909. Serial No. 472,807.

*To all whom it may concern:*

Be it known that I, LE BARON C. COLT, of Bristol, in the county of Bristol and State of Rhode Island, have invented certain new and useful Improvements in Apparatus for Varnishing Rubber Shoes; and I do hereby declare the following specification, taken in connection with the accompanying drawings, forming a part of the same, to be a full, clear, and exact description thereof.

In the manufacture of rubber shoes it is customary to apply to the exterior thereof a coat of varnish to give to the finished shoe a glossy and attractive appearance. Heretofore this coat of varnish has been applied in one of two ways, viz., either by means of a brush or by dipping the lasted shoe in a receptacle containing a quantity of liquid varnish. With each of these ways hand manipulation is required, the operation is comparatively slow and the cost correspondingly great.

The present invention relates to an apparatus for varnishing rubber shoes, which embodies means for causing a shoe or a series of shoes to travel past one or more discharge outlets, and in causing the liquid varnish to be discharged from said discharge outlets upon the shoe or shoes, as they are carried past said outlets.

The invention consists in an apparatus embodying a traveling carriage or conveyer adapted to receive and carry along a series of lasted shoes, and a series of discharge outlets arranged to discharge the varnish upon different parts of the shoes as they are carried along by said traveling carriage or conveyer past said discharge outlet, whereby the entire outer surface of the shoe will be covered with a coat of varnish.

The invention further consists in the combination, with such traveling carriage or conveyer and series of discharge outlets, of means for maintaining a circulation of varnish, whereby a continuous discharge of varnish from said discharge outlets will be provided and whereby the surplus varnish will be collected and returned to the source of supply.

The invention will be described in connection with the accompanying drawings, which illustrate the apparatus as designed and adapted to carry out the novel method of varnishing rubber shoes.

In said drawings Figure 1 is a side elevation of the apparatus,

Fig. 2 is a plan view, and

Figure 3:
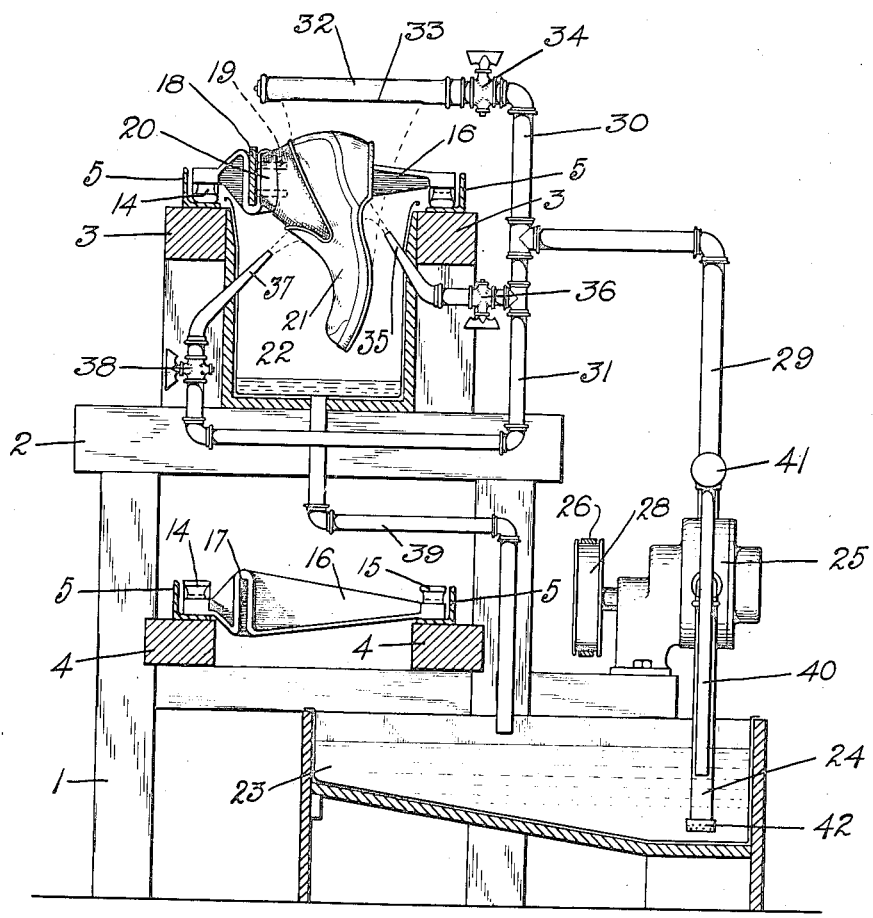
Fig. 3 is a transverse section on an enlarged scale on the line *x—x*, Fig. 1.

The frame of the apparatus comprises the standards 1, cross-bars 2, two upper longitudinal rails 3, 3, and two lower longitudinal rails 4, 4. To each of the four longitudinal rails is secured an angle iron 5, said angle irons constituting suitable tracks for the conveyer chains. Mounted in bearings at one end of this frame is a driving shaft 6 provided with fast and loose pulleys 7 and 8. Mounted in bearings at the opposite end of the machine is a shaft 9. The driving shaft 6 is provided with two sprocket wheels 10, 11, and the shaft 9 is provided with two corresponding sprocket wheels 12, 13. Passing around these sprocket wheels and extending from one end of the machine to the other are two endless conveyer chains or link belts 14, 15, arranged to ride upon the tracks 5. Secured to these conveyer chains at suitable intervals and extending crosswise of the machine are supports or holders 16. Each of these supports or holders is provided near one end with two transverse grooves or recesses 17 adapted to receive and hold the ends of the "sticks" 18, upon which the lasted shoes are carried and supported. If desired, each support or holder may have only a single groove 17 extending the entire width of said cross-bar, but it is preferred to provide two grooves separated by an intervening partition as shown, as such partition constitutes means to prevent endwise movement of the sticks in said holders. Each of said sticks 18 is provided with a series of pins 19, two for each last, adapted to enter holes in the last 20 upon which the shoe 21 is held. As shown in the drawings, each "stick" 18 carries eight shoes or four pairs.

Arranged between and extending a suitable distance below the upper rails 3, 3, is a trough 22, preferably extending the entire or for a greater part of the length of the machine, said trough being arranged to receive the surplus varnish which flows upon the shoes as well as the varnish which drips therefrom as they are carried along by the conveyer chains.

23 represents a tank or receptacle adapted to receive a quantity of varnish. In the drawings the tank is for convenience shown as located adjacent to the machine, but it will be understood that said tank may be located at any desired point remote from the machine and, if desired, even in a separate building. A suction pipe 24 leads from said tank to a pump 25. As shown this pump is operated by a belt 26 extending from a pulley 27 on the shaft 9 to a pulley 28 on the pump-shaft. As will be understood, however, said pump may be operated in any other suitable way.

Leading from the pump 25 is a delivery pipe 29. In the drawings three discharge outlets for discharging the varnish upon the shoes as they are carried along are shown, one main outlet arranged above the shoes, and two supplemental outlets. Connecting with the pipe 29 are two branch pipes 30 and 31. The branch pipe 30 extends upward and inward and has secured thereto the main outlet 32 which is thus located above the shoes as they are carried along and above the trough 22. Said main outlet 32 is shown as provided on its under side with an elongated slot 33, through which the varnish will be discharged more or less in sheet form upon the upper at the heel of the shoe. If desired, in place of the elongated slot, said outlet 32 may be provided with a series of small holes or perforations. A valve or pet-cock 34 is provided to control the discharge from said outlet 32.

The branch pipe 31 extends downward and is carried across beneath the trough 22 and upward on the opposite side of said trough. To the downwardly extending portion of the branch pipe 31 is connected a discharge outlet 35 which extends through a suitable opening in the side wall of the trough 22. Said discharge outlet 35 is provided with a valve or pet-cock 36 for controlling the discharge therefrom. This discharge outlet 35 is shown as arranged to discharge the varnish against the sole of the shoe in front of the heel. To the upwardly extending portion of the branch pipe 31 on the opposite side of the trough is a discharge outlet 37 which likewise extends through a suitable opening in the opposite side wall of the trough 22. Said discharge outlet 37, which is provided with a suitable controlling valve or pet cock 38, is shown as arranged to discharge the varnish against the upper of the shoe at the instep. A pipe 39 leads from the bottom of the trough 22 back to the tank 23. Leading from the pipe 29 is another branch pipe 40 which leads back to the tank 23. This pipe 40 is preferably provided with an automatic relief valve 41. Preferably also the lower end of the suction pipe 24 is provided with a strainer 42. When a circulation of the varnish is to be maintained the strainer may be located at some other point in the circulating system, or more than one strainer may be employed.

The operation of the apparatus above described in carrying out the method of varnishing rubber shoes is as follows: Power being applied by shifting the driving belt on to the fast pulley 7, the endless conveyer chains are set in motion and caused to travel continuously in the direction of the arrows in Fig. 1. Rotation is thereby imparted to the shaft 9, which in turn through the connecting belt 26 serves to start up the pump 25. By the operation of said pump varnish from the tank 23 is forced through the pipe 29 and branch pipes 30 and 31 and discharged continuously from the outlets 32, 35 and 37. The attendant then begins to place successive sticks of shoes in the traveling holders 16, said sticks with the shoes thereon being introduced at the left hand end of the machine, Figs. 1 and 2, and when so introduced being located and arranged as shown in Fig. 2 and following each other in close succession as they are carried along in said holders. As shown in Fig. 3, the shoes as they travel along are carried between the discharge outlets 32, 35, and 37, and in proper relation thereto, and so that the varnish discharged from said outlets will be discharged against the several portions of the shoe as hereinbefore explained and as clearly shown in Fig. 3. The varnish so discharged upon the shoe flows over the several portions thereof, leaving an even and uniform coating over the entire shoe, while the surplus flows down into the trough 22, whence it flows through the pipe 39 back to the tank 23.

The quantity of varnish to be discharged from the outlets 32, 35 and 37 may be independently regulated by opening or closing the valves 34, 36, 38 to a greater or less extent, as may be found desirable. Whenever any one or more of these valves is adjusted so that the quantity of varnish supplied by the pump is greater than the quantity which can be delivered from the outlets, the relief valve 41 will automatically open and thus permit the surplus to flow back through the pipe 40 into the tank.

The machine is preferably made of a suitable length so that when a stick of shoes has passed by the discharge outlets it will be carried along by the conveyer a greater or less distance to enable the surplus varnish to drip therefrom into the trough 22, and so that such drippings will be thereby collected and returned to the tank.

The next operation to be performed upon these rubber shoes after they have been varnished is the operation of vulcanizing. If desired, the machine as a whole may be made of a sufficient length to extend from the varnishing room to the vulcanizing room, and so that said machine, in addition to the varnishing of the shoes, may be made to serve the further purpose of transporting or conveying the varnished shoes from one room to the other or direct to the vulcanizing chamber. Wherever the end of the machine may be located the successive sticks of varnished shoes, before they reach the end of the machine, are removed by an attendant, one after the other, and disposed of as may be desired. If the machine is constructed to lead direct to the vulcanizing chamber, as above suggested, then the successive sticks of shoes may, as they are taken from the machine, be placed directly upon the racks in the vulcanizing chamber.

As will be seen, the characteristic feature of the method of varnishing rubber shoes above described consists in causing the shoe or shoes to be varnished to travel past discharge outlets from which the varnish is discharged upon and flows over the outer surface of the shoe, and so that a coat of varnish is deposited upon the entire outer surface of the shoe, as distinguished from applying the varnish by means of a brush or by dipping the shoe in a receptacle containing a quantity of varnish, as heretofore.

In practice it has been found that with this method of varnishing rubber shoes, not only is the varnish uniformly distributed over the surface of the shoe so as to provide an even and uniform coating, but in addition the discharge of the varnish upon, and its flow over, the surface of the shoe serves to wash away, as it were, or remove any dust or lint that may have accumulated thereon, and so that the finished surface is thereby rendered smooth and free from imperfections.

It is preferred to carry the shoes past the discharge outlets with the heel portions upward, as shown in the drawings, whereby the flow of the varnish downward is toward and off from the toe of the shoe, as such arrangement has been found to secure the best results and also serves to practically prevent the varnish from reaching any portion of the lining of the shoe, which is more or less objectionable. The shoes may, however, as they are carried past the discharge outlets, occupy any other position that may be desired, and in such case it will be understood that said discharge outlets will be arranged with relation to the shoe according to the position which the shoe occupies as it is carried past said outlets.

What I claim as my invention and desire to secure by Letters Patent is:

1. An apparatus for varnishing rubber shoes having in combination a carrier adapted to receive and carry along the shoe to be varnished, and means for causing a stream of varnish to flow over said shoe as it is carried along by said carrier, whereby any lint or other matter upon the shoe is carried off by the flowing varnish.

2. An apparatus for varnishing rubber shoes having in combination a carrier adapted to receive and carry along the shoe to be varnished, and means for causing separate streams of varnish to flow over different portions of said shoe as it is carried along by said carrier.

3. An apparatus for varnishing rubber shoes having in combination a carrier adapted to receive and carry along a series of shoes, and means for causing a stream of varnish to flow over successive shoes as they are carried along by said carrier, whereby any lint or other matter upon the shoe is carried off by the flowing varnish.

4. An apparatus for varnishing rubber shoes having in combination a carrier adapted to receive and carry along a series of shoes, and means for causing separate streams of varnish to flow over different portions of said shoes as they are carried along by said carrier.

5. An apparatus for varnishing rubber shoes having in combination a carrier adapted to receive and carry along a series of shoes with their heel portions upward, and means for causing a stream of varnish to flow over successive shoes as they are carried along by said carrier.

6. An apparatus for varnishing rubber shoes having in combination a carrier adapted to receive and carry along a series of shoes with their heel portions upward, and means for causing separate streams of varnish to flow over different portions of said shoes as they are carried along by said carrier.

7. An apparatus for varnishing rubber shoes having in combination a carrier adapted to receive and carry along a series of shoes, and means for causing an elongated stream of varnish to flow over successive shoes as they are carried along by said carrier.

8. An apparatus for varnishing rubber shoes having in combination a carrier adapted to receive and carry along a series of shoes, means for causing an elongated stream of varnish to flow over a portion of each successive shoe, and means for causing separate streams of varnish to flow over other portions of said shoes as they are carried along by said carrier.

9. An apparatus for varnishing rubber shoes having in combination a carrier adapted to receive and carry along a stick of shoes, and means for causing a stream of varnish to flow over successive shoes as the stick of shoes is carried along by said carrier.

10. An apparatus for varnishing rubber shoes having in combination a carrier adapted to receive and carry along a series of sticks of shoes, and means for causing a stream of varnish to flow over successive shoes as the sticks of shoes are carried along by said carrier.

11. An apparatus for varnishing rubber shoes having in combination a carrier adapted to receive and carry along a stick of shoes with their heel portions upward, and means for causing a stream of varnish to flow over successive shoes as the stick of shoes is carried along by said carrier.

12. An apparatus for varnishing rubber shoes having in combination a carrier adapted to receive and carry along a stick of shoes with their heel portions upward, means for causing an elongated stream of varnish to flow upon the heel portions of successive shoes, and means for causing separate streams of varnish to flow upon other portions of said shoes as the stick of shoes is carried along by said carrier.

13. An apparatus for varnishing rubber shoes having in combination a carrier adapted to receive and carry along successive sticks of shoes, with the heel portions of said shoes upward, a main discharge outlet arranged above the path of said shoes, and supplemental outlet arranged at one side of said path.

14. An apparatus for varnishing rubber shoes having in combination a discharge outlet and a carrier provided with laterally extending holders adapted to receive and hold a stick of shoes, the parts being so arranged that the carrier takes the shoes through the path of the discharge from the discharge outlet.

15. An apparatus for varnishing rubber shoes having in combination a discharge outlet and a carrier provided with laterally extending holders adapted to receive and support a stick of shoes longitudinally of the carrier.

16. An apparatus for varnishing rubber shoes having in combination a discharge outlet and a carrier provided with a series of laterally extending holders, each of said holders being provided with two separated grooves, one adapted to receive the end of one stick of shoes and the other to receive the end of the next stick in series.

17. An apparatus for varnishing rubber shoes having in combination a carrier adapted to receive and carry along a series of shoes, means for causing a stream of varnish to flow over successive shoes as they are carried along by said carrier, means for maintaining a circulation of varnish, and a strainer for straining the varnish as it circulates.

18. An apparatus for varnishing rubber shoes having in combination a carrier adapted to receive and carry along a series of shoes, means for causing a stream of varnish to flow over successive shoes as they are carried along by said carrier, a tank for the varnish, means for maintaining a circulation of varnish from and to said tank, and a strainer located in the circulating system.

19. In an apparatus for varnishing rubber shoes, the combination of a carrier adapted to receive and carry along successive sticks of shoes, with the heel portions of said shoes upward, and a series of discharge outlets arranged to discharge the varnish upon different portions of the successive shoes as the sticks upon which they are mounted are carried along by said carrier.

20. In an apparatus for varnishing rubber shoes, the combination of a carrier adapted to receive and carry along successive sticks of shoes, with the heel portions of said shoes upward, a main discharge outlet arranged above the path of said shoes, and a supplemental outlet arranged at one side of said path.

21. An apparatus for varnishing rubber shoes comprising a discharge outlet and a carrier provided with a series of laterally extending holders, each of said holders being provided with two separated grooves, one adapted to receive the end of one stick of shoes and the other to receive the end of the next stick in series.

LE BARON C. COLT.

Witnesses:
W. H. THURSTON,
J. H. THURSTON.